United States Patent [19]
Peterson et al.

[11] 3,853,119
[45] Dec. 10, 1974

[54] METHOD AND SYSTEM FOR DISPLAY OF ELECTROCARDIOGRAPHIC (ECG) SIGNALS

[75] Inventors: Ronald Thomas Peterson; Israel Mayer Stein, both of Boston, Mass.

[73] Assignee: Clinical Data Services, Inc., Brookline, Mass.

[22] Filed: Oct. 19, 1973

[21] Appl. No.: 407,825

[52] U.S. Cl............................................ 128/2.06 R
[51] Int. Cl.............................................. A61b 5/04
[58] Field of Search..... 128/2.06 A, 2.06 G, 2.06 R, 128/2.1 B, 2.1 R, 2.05 R

[56] References Cited
UNITED STATES PATENTS
| 2,933,364 | 4/1960 | Campbell | 128/2.1 B |
| 3,215,136 | 11/1965 | Holter et al. | 128/2.06 A |
| 3,557,354 | 1/1971 | Trimble | 128/2.1 R |

OTHER PUBLICATIONS
Blumenfeld et al., "Medical Biological Engineering" Vol. 9, 1971, pp. 637–643.

*Primary Examiner*—William E. Kamm
*Attorney, Agent, or Firm*—Martin Lukacher

[57] ABSTRACT

The method and system is described for displaying electrocardiograhic (ECG) signals on a cathode ray oscilloscope. The R wave components of the recurring ECG signals are detected and used to control a sweep generator which provides time base signals which are applied to the horizontal deflection input terminals of the oscilloscope. The analog ECG signal is digitized, stored in a memory for a predetermined period of time and then reconverted back into analog ECG signals for application to the vertical deflection inputs of the oscilloscope. The delay of the signal using the digital electronic circuitry provides requisite flexibility so that it may be utilized to display either real time ECG signals and also high speed ECG signals which have been collected and magnetically recorded at real time and then played back at many times real time as in long term electrocardiography.

11 Claims, 5 Drawing Figures

METHOD AND SYSTEM FOR DISPLAY OF ELECTROCARDIOGRAPHIC (ECG) SIGNALS

The present invention relates to methods of and systems for displaying recurring physiological information, and particularly the methods and systems for displaying electrocardiographic information, such as the information which is contained in the electrocardiogram signals (ECG signals) which represent the cardiovascular responses of a person.

The invention is especially suitable for use in processing on-line real time ECG signals and also for processing of previously recorded long-term ECG signals, so as to obtain data which may be useful in the prognosis of heart disease, as well as in the understanding of the mechanisms of heart disease.

The invention is also useful for displaying ECG information which may be used for prognostically detecting individuals likely to experience sudden cardiac death, in monitoring the ECG of patients during the acute phase of a myocardial infarction, in follow-up studies and rehabilitation programs for patients' postmyocardial infarction, for investigating the effect of pharmacological agents in suppressing abnormal cardiac rhythms, for documenting the cardiac origin of a patent's symptoms, and in monitoring the patient with an implanted electronic pace maker.

The diagnosis of and the prevention of death and disability from heart disease oftentimes requires an analysis of an electrocardiogram obtained from a patient in the course of his normal activities over long periods of time. In addition, these longterm electrocardiograms, which are usually taken while the patient is in motion over a long period of time rather than while resting, are desirable over predetermined stress situations such that the variation with different activities at different times of the day may be ascertained. Similarly, the long term electrocardiograms are of particular interest in cases where pharmacologic agents are utilized, in order to determine the effect of such agents on the cardiac response of particular patients.

It is especially desirable that both on-line, real-time ECG signals and the high speed playback of long-term recorded ECG signals be displayed in a manner which yields the data respecting the cardiac response of the patient so as to permit the observer to readily characterize abnormalities of heart rhythm and cardiac events of interest. While displays of ECG signals, either on a real time basis or at high playback speed for long term recorded ECG signals, has provided usable displays, such systems are not particularly reliable nor are they flexible enough to handle both real time and high speed long term ECG recorded signals. This is particularly the case since high speed ECG signals may be available at different speeds, say 20 times to 60 times real time. The prior ECG display systems which have the disadvantages referred to above include those described in U.S. Pat. Nos. 3,215,136 and 3,229,687, and in application Ser. No. 133,627, filed 4/13/71 (assigned to the assignee of the present application, which is now U.S. Pat. No. 3,779,237 issued 12/18/73) and in U.S. Pat. No. 3,457,452. The present invention has the further advantage of eliminating the need for simultaneously recording on two tracks with displaced heads as shown in the first two above-mentioned patents, or the need for displaced heads even on a single track as in the above-mentioned application, which is now U.S. Pat. No. 3,779,237 issued 12/18/73. The invention further eliminates the need for after-the-fact predictive techniques as in the last-mentioned patent.

Accordingly, it is an object of the present invention to provide an improved method of and means for displaying electrocardiographic signals.

It is a further object of the present invention to provide an improved method of and means for displaying electrocardiographic signals in correct physiological order which is not dependent upon a priori, or predictive amounts of R-wave delay.

It is a further object of the present invention to provide an improved method of and means for displaying ECG signals which display also indicates the repetition rate of those signals (viz., the heart rate).

It is a still further object of the present invention to provide an improved method of and system for displaying ECG signals which are acquired over a long period of time and which are played back at high speed, which system is sufficiently flexible to handle systems played back at different high speeds.

It is a still further object of the present invention to provide an improved method of and system for display of cardiac sequences as represented by both real time and greater than real time ECG signals and which provide the display in both cases as though the signals were recurring in real time.

Briefly described, the invention involves the digitization of the ECG signals. In the first channel, a digitized signal which may be a pulse occurring in synchronism with the R-wave is provided. In the other channel there are provided multi-bit digital signals each corresponding to the amplitude of a successive increment or sample of the ECG signals. The multi-bit digital signals are loaded in memory and stored therein, in digital form, for a predetermined period of time which may be readily controllable by controlling the repetition rate of clock or timing signals which are applied to either address, read-in, or read-out the memory. In this connection, the memory and address electronics of a commercially available mini-computer which may be adapted for the purpose by suitable programming thereof may be provided. By the term "mini-computer" is meant a small general purpose computer. The memory is read-out into a digital to analog converter to reconstitute the analog ECG signal which may then be applied to the vertical deflection terminals of a cathode ray oscilloscope. The first digitized signal is used to control or generate the time base signal for the oscilloscope. This signal may be applied to the horizontal inputs of the oscilloscope. The resulting display on the oscilloscope represents the cardiac response of the patient and may be utilized in the same manner whether or not real time or greater than real time ECG signals are processed by the system to provide the display.

The invention itself as well as the foregoing and other objects, features and advantages thereof will be more readily apparent from the following description when taken in connection with the accompanying drawings in which.

Figure 1:
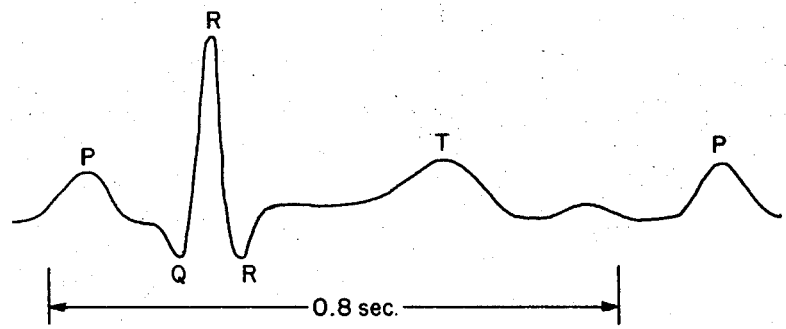
FIG. 1 is an enlarged representation of a single cycle of a typical ECG signal including the P wave segment of the next occurring cycle or complex of the signal.

Referring to FIG. 1, there is shown a typical cycle of a recurring periodic ECG signal. The amplitude variations of the signal are shown along the ordinate while the abscissa represents time. Physiologically, the waveform begins with the P wave. After the P wave, there occurs an isoelectric segment followed by a negative going Q wave which in turn is followed by an R wave which in turn is followed by a negative going S wave. Another isoelectric period follows the S wave and the cycle or complex ends with the positive going T wave. The P wave of the next complex is also indicated. This waveform represents the periodically recurring cycle of the human heart and is of clinical value when displayed in the physiologic order of its occurrence. Such a display is provided in accordance with this invention.

Figure 2:
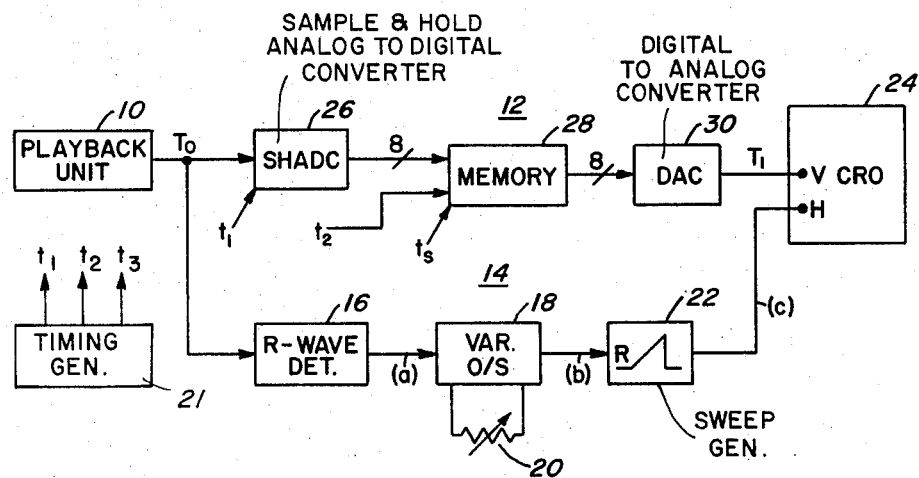
FIG. 2 is a block diagram showing an ECG display system in accordance with the invention.
Figure 4:
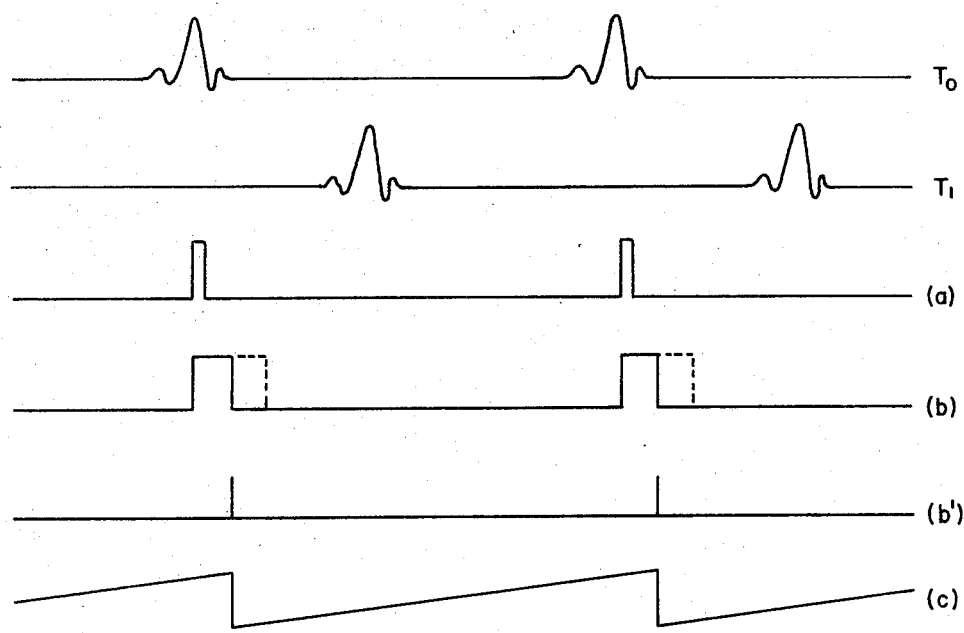
FIG. 4 is a waveform diagram illustrating signals as they appear in the system shown in FIG. 2.

Referring to FIG. 2, the ECG signals may be provided at greater than real time by a playback unit 10 which may be a magnetic tape reproducing or playback machine which operates at anywheres from 20 to 60 times real time, the signals which are recorded for playback on the unit 10 being recorded at real time, but at very slow speed, say approximately one-tenth of an inch per second. The playback unit also includes the playback electronics to provide the analog ECG signal which is shown in FIG. 4 as the signal $T_o$. Alternatively, the ECG signal may be directly obtained on-line, real-time from a patient by means of electrodes and by either hard wire or telemetric transmission. The ECG signal is applied to two digitizing channels 12 and 14. The channel 14 provides a digital signal corresponding to a recurring portion of the ECG signal, in this embodiment the R wave. To this end an R wave detector 16 produces a single pulse, indicated in waveform (a) of FIG. 4, upon occurrence of each R wave of each cardiac cycle. A conventional R wave detector may be used for this purpose. The digital signals of the input of the channel are therefore single pulses. These pulses are applied to the input of a variable width pulse generator 18 indicated as a variable one-shot 0/S multivibrator. The one-shot 18 produces a pulse the width of which may be varied as by a variable potentiometer 20 in the multivibrator circuit thereof. Such multi-vibrators are well known in the art and are not described in detail herein. The output pulse from the one-shot 18 is illustrated in waveform (b) of FIG. 4. The dash line indicates the control over the pulse period as may be provided by adjustment of the potentiometer 20.

The lagging edge of the pulse generated by the one shot 18 is applied to a time base generator 22 which is a sawtooth wave or sweep generator. This generator includes an integrating circuit which is reset upon the lagging or trailing edge of the one-shot output pulse which is shown in waveform (b') of FIG. 4. The pulse which resets the integrating circuit of the sweep generator 22 may be provided by differentiating circuit or other means known in the art. The sawtooth wave as generated by the circuit 22 is illustrated in waveform (c) of FIG. 4 and is applied to the horizontal input of a cathode ray oscillograph 24. Alternatively, the pulse shown in b' may be used to synchronize an internally generated sweep or deflection, voltage occurring generated in the electronics of the oscilloscope 24.

Figure 5:
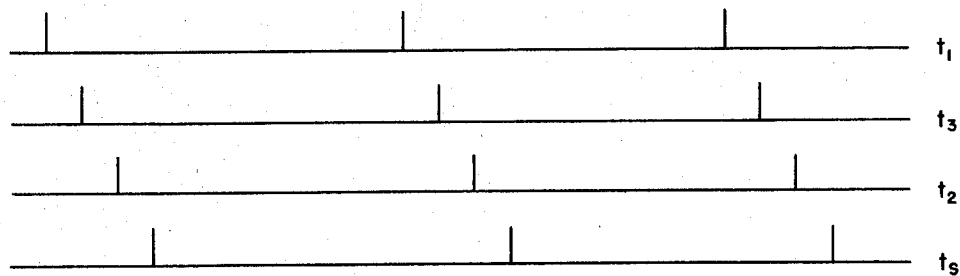
FIG. 5 is a timing diagram illustrating the timing signals in the system illustrated in FIGS. 2 and 3.

In the other digital channel 12, the signal is applied to a sample and hold analog to digital converter (SHADC) 26. The conversion of successive samples or increments of ECG signals is timed by a timing signal or clock pulse $t_1$ (see FIG. 5). The repetition rate of the timing signals $t_1$ and of the other timing signals shown in FIG. 5 is very much higher than the repetition rate of the ECG signal, for example, 100 times higher. Thus, if the playback unit provided ECG signals at real time, the duration of which might be 0.8 seconds for each cardiac cycle or complex as shown in FIG. 1, the spacing of the timing signals might suitably be 10 milliseconds (ms). The timing signal $t_1$ as well as the other timing signals $t_2$, $t_3$, $t_s$, may be provided by a clock or timing generator 21 which includes a clock oscillator and a suitable digital counter or digital delay circuit. Circuits of this type are known in the art and are even available in integrated circuit form from several vendors. Thus, the timing signal generator is not shown in detail herein.

The output of the SHADC is a multi-bit digital signal which appears in parallel on 8 output lines (viz., an 8-bit digitally coded signal, a binary code being suitable). This signal is applied or loaded into the memory by the $t_2$ timing signal. The memory 28 may for example be a shift register which is strobed by the $t_s$ timing signal. The shift register may have sufficient number of stages such that each digitized ECG signal sample is stored for a predetermined period of time. A suitable period of time is one-half of a cardiac cycle. Thus, by properly proportioning the rate of the timing signals and the number of stages in the shift-register register, the necessary storage period and digital delay can be obtained. The output of the memory produces the digitized ECG signal again as a parallel multi-bit signal on 8 output lines which are applied to a digital to analog converter 30. The converter may include ladder networks and analog filters for reconstituting the ECG signal back into its analog form. The delayed and reconstituted ECG signal is illustrated in waveform $T_1$ as shown in FIG. 4. This signal is applied to the vertical input of the oscilloscope 24.

The tracing of the oscilloscope is thus readily controllable and the system is flexible enough to handle greater than real time ECG signals at various rates. By virtue of the digital delay in the memory, the tracing on the oscilloscope begins before the P wave and each individual P-QRS-P complex is displayed as shown in FIG. 1. Inasmuch as the sweep duration is proportional to the heart rate the heart rate can be read from a scale immediately below the complex on the face of the screen of the oscilloscope. Variations in heart rate appear primarily as a change in the length of the diastolic period after the T wave and before the next P wave. Thus, the single complexes are not only individually displayed and the direct reading of heart rate presented, but differences in duration of succeeding complexes on a heart-beat to heart-beat basis is presented. The display is therefore of clinical value in the analysis and prognosis of heart disease as explained above.

Figure 3:
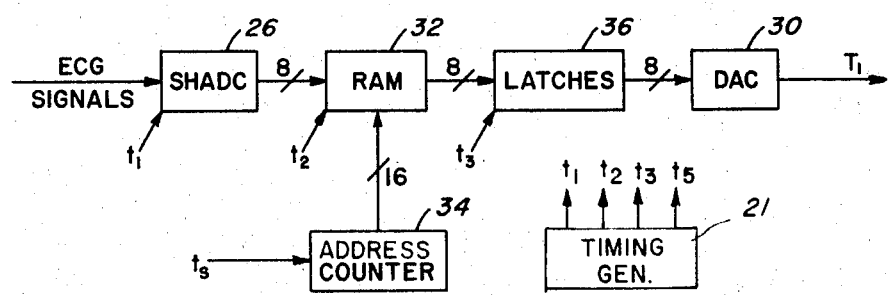
FIG. 3 is a more detailed block diagram showing one of the channels of the system illustrated in FIG. 2; the channel shown being the one which handles multi-bit digital signals.

FIG. 3 illustrates the use of a random access memory 32, an address counter 34, together with associated latches 36 as may be provided in a commercially available mini-computer. The system uses a SHADC 26 and DAC 30 as explained above in connection with FIG. 2.

The address counter counts $t_s$ timing signals, and by its 16 output lines to the RAM, addresses RAM locations into which input signals are loaded and different address locations from which output signals are read.

Timing signals $t_3$ load the digital signals from the output addresses into the latches 36. Then new digital signals are loaded by the $t_2$ timing signal into the input addresses established by the counter. The counter is programmed so that an input address count will occur as an output address count after a predetermined number of $t_s$ pulses; thus providing the requisite predetermined delay. In the event that the RAM 32 and ADR counter 34 are implemented apart from a mini-computer the delay may be provided by using a conventional roll over binary counter with the number of stages to provide the requisite delay.

From the foregoing description it will be apparent that there has been provided a powerful method of and system for displaying ECG signals, as on an oscilloscope. While the system has been described in two embodiments, variations and modifications within the scope of the invention will undoubtedly suggest themselves to those skilled in the art; thus the foregoing description should be taken as illustrative and not in any limiting sense.

What is claimed is:

1. A method of displaying analog ECG signals with the aid of an oscilloscope which has a time base input and an amplitude input, said method comprising the steps of
  a. digitizing said signals to provide a first digital output upon each corresponding recurring portion thereof and a plurality of second digitally coded signals each corresponding to a successive amplitude increment thereof,
  b. storing said second signals each for predetermined periods of time,
  c. reconverting said second signals into their analog ECG signal form,
  d. applying said reconverted second signal to the amplitude input of said oscilloscope,
  e. generating a time base signal synchronous with said first digital output, and
  f. applying said time base signal to the time base input of said oscilloscope.

2. The invention as set forth in claim 1 wherein said digitizing step includes the steps of
  a. detecting the occurrence of said corresponding recurring portions,
  b. producing a pulse upon each detection to provide said first digital outputs,
  c. sampling said ECG signals at a rate very much greater than the expected rate for normal ECG signals of said first outputs,
  d. producing very many more of said second signals than said first signals.

3. The invention as set forth in claim 1 wherein said predetermined periods of time are less than the expected period for normal ECG signals of said first outputs.

4. The invention as set forth in claim 2 wherein said predetermined periods of time for storing second signals during said storing step are each for a period of time of less duration than the expected period between said first signals for normal ECG signals.

5. The invention as set forth in claim 4 wherein said generating step includes the steps of
  a. generating a time base signal which increases in amplitude from a certain amplitude,
  b. resetting said signal to said certain amplitude in accordance with the occurrence of said first output.

6. A system for displaying ECG signals on an oscilloscope having amplitude and time base inputs, said system comprising
  a. means for digitizing ECG signals to provide first digital outputs upon occurrence of a recurring portion of each said ECG signals and second digital outputs each consisting of a multi-bit digital signal upon successive incremental portions of said ECG signals which corresponds to the amplitude thereof,
  b. memory means for storing said second digital signals for predetermined periods of time,
  c. digital to analog converter means responsive to said second signals after storage thereof in said memory means for providing signals corresponding to said first signals,
  d. means for applying said signals from said converting means to said amplitude inputs of said oscilloscope,
  e. means for generating time base signals synchronous with said first digital signals, and
  f. means for applying said time base signals to said time base input of said oscilloscope.

7. The invention as set forth in claim 6 wherein said memory means has a plurality of storage locations for each of said second digital signals, and means for retaining said digital signals in said memory for a predetermined period of time.

8. The invention as set forth in claim 7 wherein said memory means comprises a random access memory, address counter means for controlling the locations into which said second digital signals are loaded and from which said second digital signals are read out, said retaining means including means for applying timing signals to said counter at a rate much greater than the rate of repetition of said corresponding recurring portions of said ECG signals in normal ECG signals for selecting said loading and readout locations and the time when each thereof is addressed by said counter.

9. The invention as set forth in claim 7 wherein said memory is a shift register, into the first stage of which said second digital signals are read in and from the last stage of which said signals are read out into said digital to analog conversion means, and said retaining means including means for applying shift pulses to said register at a rate very much greater then the rate of occurrence of said first digital signals.

10. The invention as set forth in claim 8 wherein said memory means further comprises a plurality of latches each for a different bit of said second digital signal, and said retaining means includes means for applying second timing signals for loading said second digital signals when read out of said random access memory into said latches, said second timing signals being at the same rate as said first named timing signals and displaced in time ahead of said first timing signals.

11. The invention as set forth in claim 10 wherein said digitizing means includes a R-wave detector for providing as said first digital signal, said generating means includes means coupled to said R-wave detector for providing a pulse synchronous with said first digital signal, a saw-tooth wave generator, and means for reinitiating said wave synchronously with said pulse, said wave from said saw-tooth wave generator providing said time base input to said oscilloscope.

* * * * *